April 24, 1928.  M. H. WILDE  1,667,179
PUMP
Filed Oct. 12, 1926
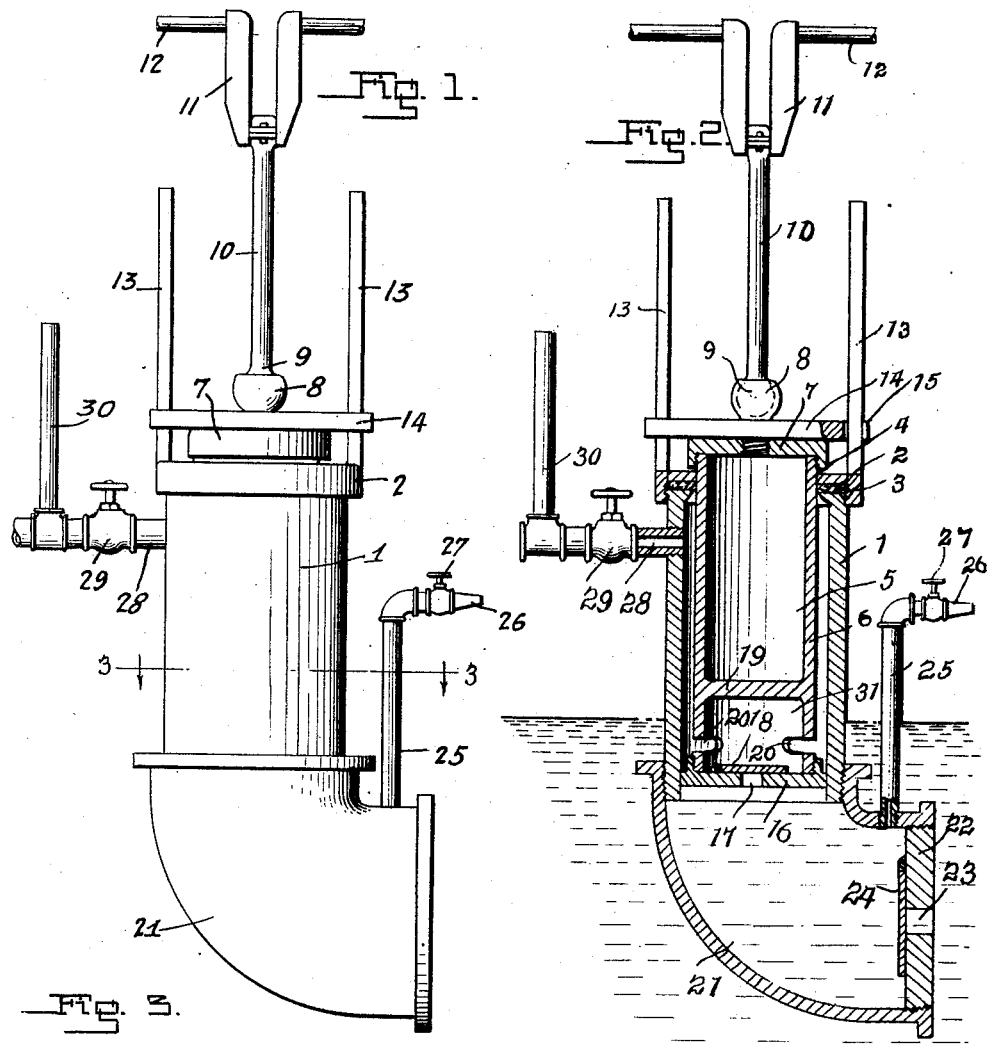
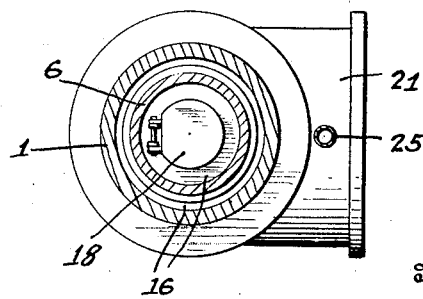
Inventor
M. H. Wilde.

Patented Apr. 24, 1928.

1,667,179

UNITED STATES PATENT OFFICE.

MIFFLIN H. WILDE, OF MARTINSBURG, WEST VIRGINIA.

PUMP.

Application filed October 12, 1926. Serial No. 141,153.

This invention relates to pumps of the reciprocating piston type and has as its general object to provide a pump which will operate with less power and more efficiently than pumps of this general type which are now employed.

Another object of the invention is to provide in a pump of the class mentioned, a novel form of piston which in its operation will function more effectually than such pistons as ordinarily constructed and will require less power for its reciprocation.

In the accompanying drawings:

Figure 1 is a side elevation of a pump embodying the present invention.

Figure 2 is a vertical sectional view therethrough.

Figure 3 is a horizontal sectional view taken substantially on the line 3—3 of Figure 1, looking in the direction indicated by the arrows.

The pump embodying the invention comprises a cylinder indicated by the numeral 1, to the upper end of which is fitted a head 2 preferably threaded into place, and a packing gasket 3 is provided between the head and the upper end of the cylinder 1. The head 2 is provided centrally with an opening 4 slidably accommodating the piston of the pump, which is indicated in general by the numeral 5. The said piston comprises a hollow cylindrical body 6 to the upper end of which is threaded a head 7 carrying a socket 8 in which is arranged a ball 9 at the lower end of a connecting rod 10 connected at its upper end to a crank 11 on a shaft 12 driven from any suitable source of power, or the connecting rod may be connected with a pump handle to be manually operated. Guides 13 are supported at diametrically opposite sides of the head 2 and extend upwardly therefrom in parallel relation to each other, and a cross head 14 which is fixed upon the head 7 is provided at its ends with recesses 15 slidably fitting the said guides 13.

The numeral 16 indicates a head which is removably threaded onto the lower end of the piston body 5 and this head is provided centrally with an opening or port 17 normally closed by a gravity actuated valve 18 which is preferably a flap valve. A partition 19 is provided within the body 6 of the piston 5 above the head 16 and a suitable number of ports 20 are formed in the wall of the body 6 at diametrically opposite sides thereof and between the head 16 and the partition 19. The numeral 21 indicates an elbow which is threaded onto the lower end of the cylinder 1 and into the horizontal branch of this elbow there is threaded a head 22 having a water intake opening 23 therein adapted to be closed by a gravity actuated valve 24 which is also preferably a flap valve. The numeral 25 indicates a removable pipe which when in use is threaded into the upper side of the horizontal branch of the elbow 21 and this pipe is provided with a jet 26 at its upper end and with a manually operable cut-off valve 27 which may be adjusted so as to control the admission of air to the pipe 25 and into the elbow 21 through the jet 26, the lower portion of the cylinder 1 and the elbow being submerged in the water or other liquid to be pumped, as will be observed by reference to Figure 2. An inwardly opening check valve is provided in the jet 26 to prevent expelling of air when the piston moves downwardly.

A short pipe 28 is threaded into one side of the cylinder 1 near the upper end thereof and communicates with the casing of a manually operable cut off valve 29 from which casing there leads a pipe 30 for conducting the water to the plate where it is to be delivered.

From the foregoing description of the invention, it will be evident that as the piston 5 moves downwardly in the cylinder 1, the valve 24 will be closed and water will enter the chamber 31 which is provided between the head 16 and partition 19 of the piston, past the valve 18, and will flow through the ports 20 and into the space between the piston and the wall of the cylinder. On the upstroke of the piston the valve 24 will be opened and water will be drawn in by suction through the opening 23 and the valve 18 will be closed so that the water which is trapped in the space between the piston and the cylinder wall will be delivered through the pipe 28. On the next down stroke, additional water will flow past the valve 18 and the water then between the cylinder and the piston will be forced into the discharge pipe, so that after a few strokes of the piston there will be a discharge on each up and each down stroke and, by making the parts in the proper proportions, the discharge may be equal on the two strokes. The flow at the end of the discharge pipe is continuous when the pump is in full operation. On the upstroke of the piston 5, air will be drawn into the elbow 21 through the pipe 25, thus aerating the water.

Having thus described the invention, what I claim is:

1. A pump comprising a cylinder open at its lower end and having an outlet adjacent its upper end, a head for the upper end of said cylinder, a piston extending through said head into said cylinder and adapted to move fluid into the cylinder through the open lower end thereof and force the fluid through the outlet when the piston is reciprocated, an elbow having one end connected with the lower end of said cylinder, a head removably connected with the other end of said elbow and formed with an inlet opening, an inwardly opening closure for said inlet, a valve controlled air inlet pipe leading from said elbow, and means for reciprocating said piston.

2. A pump comprising a cylinder open at its lower end, a head for the upper end of said cylinder, a piston extending through said head into said cylinder in spaced relation to the walls of the cylinder, a transverse partition in said piston forming a lower chamber therein, a head at the lower end of said piston projecting radially therefrom with its edge faces contacting with the walls of said cylinder and constituting an elevator for fluid in the cylinder about the piston, said piston head having an opening communicating with said chamber and the piston having openings in its walls establishing communication between the chamber and cylinder, an upwardly opening closure for the opening in the piston head, said cylinder having an outlet adjacent its upper end, an elbow having one end connected with the lower end of said cylinder, a removable head for the other end of said elbow formed with an inlet opening, an inwardly opening closure for the inlet opening, a valve controlled air inlet pipe leading from said elbow, and means for imparting reciprocating motion to said piston.

In testimony whereof I affix my signature.

MIFFLIN H. WILDE. [L. S.]